US007935316B2

(12) United States Patent
Gyonouchi et al.

(10) Patent No.: US 7,935,316 B2
(45) Date of Patent: May 3, 2011

(54) CHEMICAL REACTION CARTRIDGE AND METHOD FOR USING

(75) Inventors: Katsumori Gyonouchi, Musashino (JP); Nobuyuki Takeuchi, Musashino (JP); Takeo Tanaami, Musashino (JP); Hisao Katakura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 528 days.

(21) Appl. No.: 12/013,019

(22) Filed: Jan. 11, 2008

(65) Prior Publication Data

US 2008/0213143 A1 Sep. 4, 2008

(30) Foreign Application Priority Data

Jan. 16, 2007 (JP) ................................ 2007-007281

(51) Int. Cl.

| | |
|---|---|
| ***B01J 7/02*** | (2006.01) |
| *B01J 19/00* | (2006.01) |
| *B01L 3/00* | (2006.01) |
| *B01L 99/00* | (2006.01) |
| *B01L 9/00* | (2006.01) |

(52) U.S. Cl. ........ 422/236; 422/129; 422/500; 422/547; 422/560; 422/565; 422/566; 422/567

(58) Field of Classification Search .................... 422/99, 422/102, 104, 129, 236
See application file for complete search history.

(56) References Cited

U.S. PATENT DOCUMENTS

| | | | | |
|---|---|---|---|---|
| 5,443,890 | A * | 8/1995 | Ohman ........................ | 428/167 |
| 5,932,315 | A | 8/1999 | Lum et al. | |
| 2003/0025129 | A1 | 2/2003 | Hahn et al. | |
| 2004/0254559 | A1 | 12/2004 | Tanaami et al. | |

FOREIGN PATENT DOCUMENTS

| | | | |
|---|---|---|---|
| DE | 10 2004 023 217 | A1 | 12/2004 |
| JP | 2005037368 | A | 2/2005 |
| JP | 2006-112836 | A | 4/2006 |
| WO | 92/14132 | A1 | 8/1992 |
| WO | 02/01181 | A2 | 1/2002 |

* cited by examiner

*Primary Examiner* — Walter D Griffin
*Assistant Examiner* — Natasha Young
(74) *Attorney, Agent, or Firm* — Sughrue Mion, PLLC

(57) ABSTRACT

Disclosed is a chemical reaction cartridge including an elastic body with which at least a portion of the chemical reaction cartridge is formed and a plurality of chambers and a flow path to connect the plurality of chambers, which contain solution inside, and the solution is moved or blocked in the chambers and the flow path by applying external force to the elastic body from outside, the elastic body is structured in at least two elastic body layers which are layered vertically and the plurality of chambers and the flow path are provided between an upper elastic body layer and a lower elastic body layer, and the elastic body is attached to a surface of a substrate made of hard material.

16 Claims, 7 Drawing Sheets

CHEMICAL REACTION CARTRIDGE AND METHOD FOR USING

BACKGROUND OF THE INVENTION

1. Field of the Invention

The present invention relates to a chemical reaction cartridge and a method for using for carrying out chemical reaction by sending a solution which is in a chamber or in a flow path.

2. Description of Related Art

Conventionally, a test tube, a beaker, a pipette and the like are generally used for processes such as a synthesis, dissolution, detection, a separation or the like of a solution. For example, a substance A and a substance B are collected in the test tubes or the beakers in advance, these substances are injected into the other container which is a test tube or a beaker, and a substance C is prepared by mixing/agitating the mixture of substances A and B. Concerning the substance C synthesized in such way, for example, a light emission, a heat generation, coloration, a colorimetry and the like are observed. Alternatively, in some cases, filtration, a centrifugal separation, or the like is carried out for the mixed substance, and a targeted substance is separated and extracted.

Moreover, glassware such as a test tube, a beaker or the like is also used in a dissolution process which is a process of dissolving a substance by an organic solvent, for example. Similarly in case of a detection process, a test substance and a reagent are introduced in a container and the reaction result is observed.

As a chemical reaction cartridge used for such purpose, there is known a cartridge in which a plurality of chambers recessed in a front surface side and flow path which connects the plurality of chambers to one another are formed on a back surface of the elastic body, and in which a substrate is attached on the back surface of the elastic body so as to hermetically seal the chambers and the flow path (for example, see JP2005-037368A). Concerning the above chemical reaction cartridge, solutions such as a sample and a reagent are injected inside the chambers in advance, the flow path, the reaction chamber, or both thereof are partially deformed by pressing a roller from the front surface side of the elastic body, and the solutions in the flow path or in the reaction chambers move. In such way, the solutions are mixed or the reagent is added to a solution.

However, in the above described chemical reaction cartridge, the elastic body is made of soft material such as silicone rubber, for example, and the substrate is made of hard plastic such as polystyrene, polycarbonate or the like. Therefore the adherability and the permeability of the solution injected inside differ between the elastic body and the substrate. Thus, there was a case where a trouble occurs during the solution sending. Further, there is a problem that the positioning and the fixing of the substrate and the elastic body are difficult when the substrate and the elastic body are attached. Furthermore, it is difficult to separate the substrate and the elastic body after the substrate and the elastic body are attached, and it is difficult to recycle and to separate the substrate and the elastic body for disposing.

SUMMARY OF THE INVENTION

In view of the above problems, a main object of the present invention is to provide a chemical reaction cartridge in which the adherability and the permeability of the solution moving in the chamber and the flow path are equal and in which a fine solution sending can be carried out and a method for using.

According to a first aspect of the present invention, there is provided a chemical reaction cartridge comprising an elastic body with which at least a portion of the chemical reaction cartridge is formed and a plurality of chambers and a flow path to connect the plurality of chambers, which contain solution inside, and the solution is moved or blocked in the chambers and the flow path by applying external force to the elastic body from outside, the elastic body is structured in at least two elastic body layers which are layered vertically and the plurality of chambers and the flow path are provided between an upper elastic body layer and a lower elastic body layer, and the elastic body is attached to a surface of a substrate made of hard material.

According to a second aspect of the present invention, there is provided a chemical reaction cartridge comprising an elastic body with which at least a portion of the chemical reaction cartridge is formed and a plurality of chambers and a flow path to connect the plurality of chambers, which contain solution inside, and the solution is moved or blocked in the chambers and the flow path by applying external force to the elastic body from outside, the elastic body is structured in at least two elastic body layers which are layered vertically and the plurality of chambers and the flow path are provided between an upper elastic body layer and a lower elastic body layer, and a substrate which is harder than the elastic body is attached to a lower surface of the lower elastic body layer by a concave portion formed on one of the lower surface of the lower elastic body layer and an upper surface of the substrate engaging with a convex portion formed on other of the lower surface of the lower elastic body layer and the upper surface of the substrate.

According to a third aspect of the present invention, there is provided a method for using a chemical reaction cartridge comprising an elastic body with which at least a portion of the chemical reaction cartridge is formed and a plurality of chambers and a flow path to connect the plurality of chambers, which contain solution inside, the method comprising moving or blocking the solution in the chambers and the flow path by applying external force to the elastic body from outside, providing the plurality of chambers and the flow path between an upper elastic body layer and a lower elastic body layer, the elastic body being structured in at least two layers in which the upper elastic body layer and the lower elastic body layer are layered vertically attaching the elastic body to a hard substrate, and disposing the elastic body and recycling the substrate after a chemical reaction of the solution is carried out.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 2A and 2B are cross-sectional views of the chemical reaction cartridge 1 cut along the line II-II, wherein FIG. 2A shows a state before the two layered elastic body 11, 12 and the substrate 13 are attached and FIG. 2B shows a state after the two layered elastic body 11, 12 and the substrate 13 are attached;

FIGS. 5A and 5B are cross-sectional views of a chemical reaction cartridge 3 cut along the line II-II of FIG. 1B, wherein FIG. 5A shows a state before a two layered elastic member 31, 32 and a substrate 33 are attached and FIG. 5B shows a state after the two layered elastic body 31, 32 and the substrate 33 are attached;

FIGS. 6A and 6B are cross-sectional views of a chemical reaction cartridge 4 cut along the line II-II of FIG. 1B, wherein FIG. 6A shows a state before a two layered elastic body 41, 42 and a substrate 43 are attached and FIG. 6B shows a state after the two layered elastic body 41, 42 and the substrate 43 are attached;

DESCRIPTION OF THE PREFERRED EMBODIMENTS

Hereinafter, embodiments of the present invention will be described with reference to the drawings.

First Embodiment

Figure 1A:
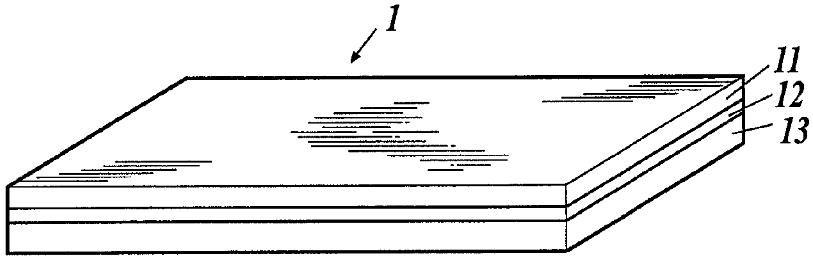
FIG. 1A is a perspective view of a chemical reaction cartridge 1.
Figure 1B:
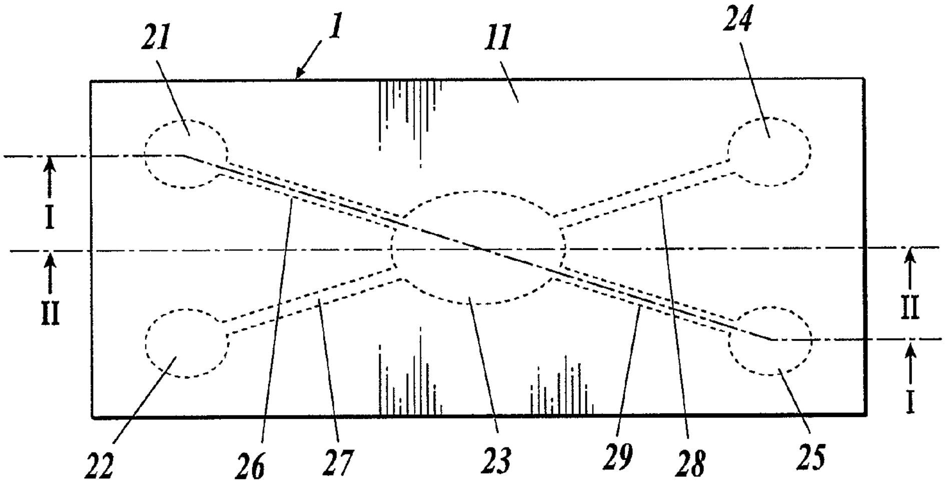
FIG. 1B is a top view of the chemical reaction cartridge 1.
Figure 1C:
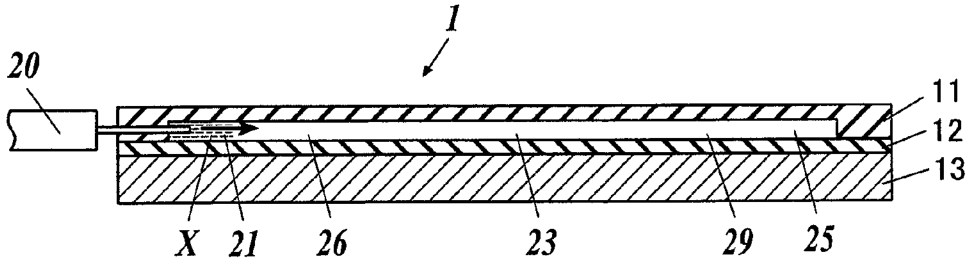
FIG. 1C is a cross-sectional view of the chemical reaction cartridge 1 cut along the line I-I.
Figure 2A:
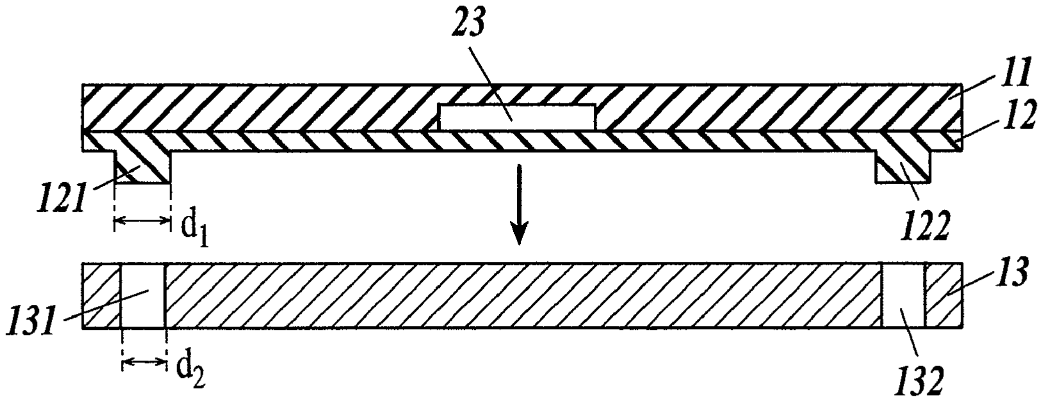
Figure 2B:
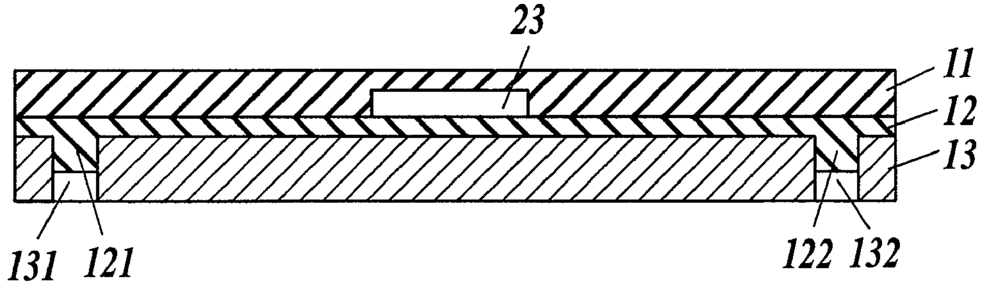
Figure 3A:
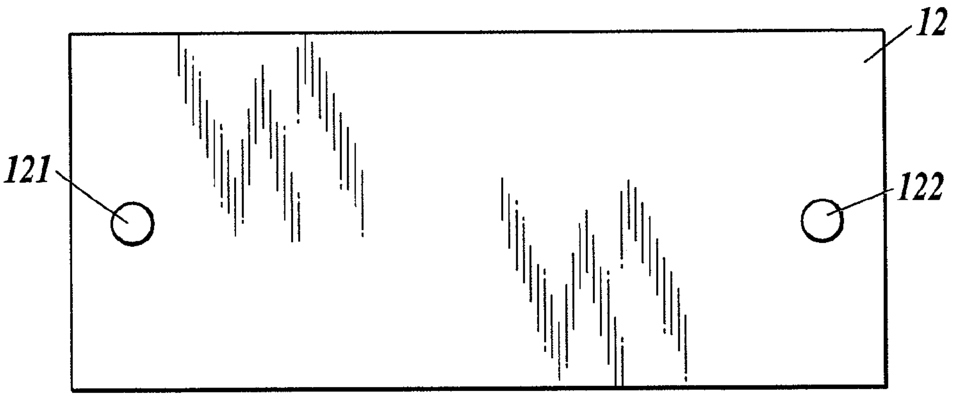
FIG. 3A is a bottom view of the lower elastic body layer 12.
Figure 3B:
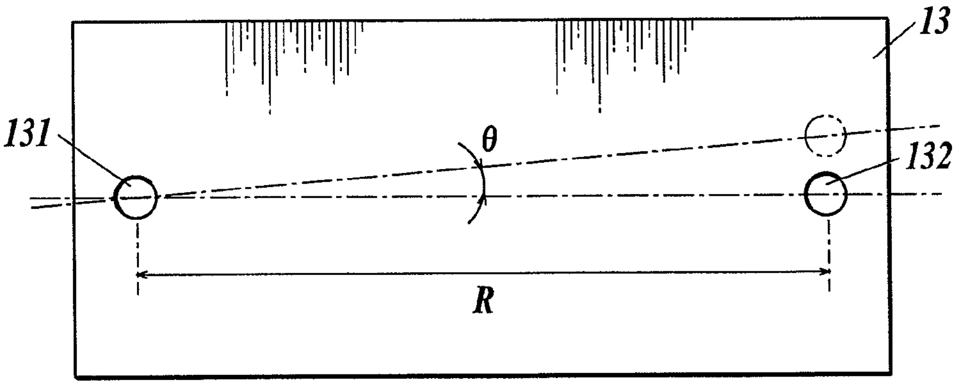
FIG. 3B is a top view of the substrate 13.
Figure 4A:
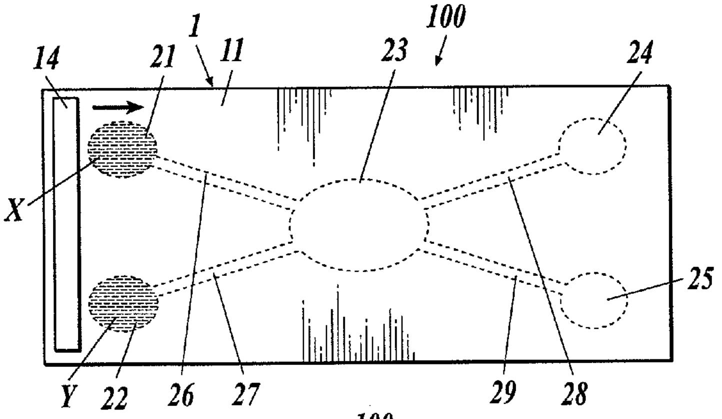
FIG. 4A to 4C are top views of a chemical reaction apparatus 100 showing the movement of a roller 14.
Figure 4B:
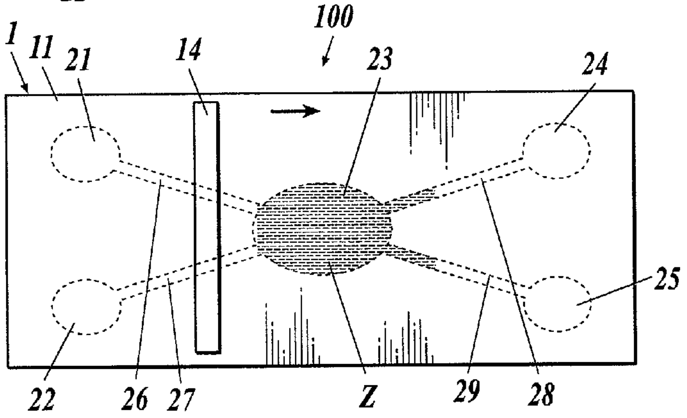
Figure 4C:
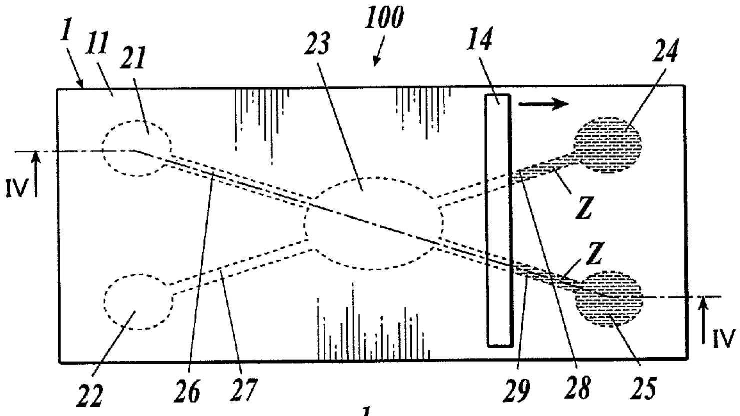
Figure 4D:
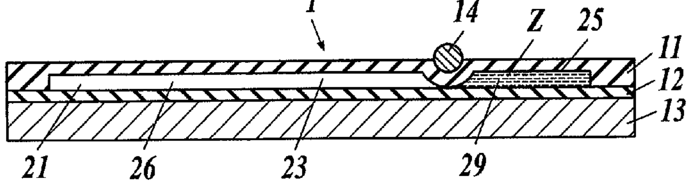
FIG. 4D is a cross-sectional view cut along the line IV-IV of FIG. 4C.

FIG. 1A is a perspective view of a chemical reaction cartridge 1, FIG. 1B is a top view of the chemical reaction cartridge 1 and FIG. 1C is a cross-sectional view of the chemical reaction cartridge 1 cut along the line I-I. FIGS. 2A and 2B are cross-sectional views of the chemical reaction cartridge 1 cut along the line II-II, wherein FIG. 2A shows a state before the two layered elastic body 11, 12 and the substrate 13 are attached and FIG. 2B shows a state after the two layered elastic body 11, 12 and the substrate 13 are attached. FIG. 3A is a bottom view of the lower elastic body layer 12, FIG. 3B is a top view of the substrate 13, FIG. 4A to 4C are top views of a chemical reaction apparatus 100 showing the movement of a roller 14 and FIG. 4D is a cross-sectional view cut along the line IV-IV of FIG. 4C.

As shown in FIGS. 1A to 4D, the chemical reaction apparatus 100 comprises a cartridge 1 which is structured by a plurality of chambers 21 to 25 and flow path 26 to 29 connecting the chambers 21 to 25 which contain the solution being formed between the two layered elastic body (hereinafter, called the upper elastic body layer 11 and the lower elastic body layer 12), wherein the two layered elastic body 11, 12 are layered on the substrate 13, and a roller 14 which applies external force to the elastic bodies 11 and 12 to partially seal the flow path 26 to 29, the chambers 21 to 25 or both the flow path 26 to 29 and the chamber 21 to 25 by moving on the upper elastic body layer 11 while contacting with the upper surface of the upper elastic body layer 11 to move the solutions X and Y which are in the sealed flow path 26 to 29 or in the sealed chambers 21 to 25.

As shown in FIGS. 1A to 1C, the upper elastic body layer 11 and the lower elastic body layer 12 are made of a silicone rubber such as a PDMS (polydimethylsiloxane) or the like or high polymer material which has elasticity in an air tight condition, and the upper elastic body layer 11 and the lower elastic body layer 12 are formed in an elongated planar shape having the same size as the substrate 13. Here, viscoelastic bodies or plastic bodies can be used for the upper elastic body layer 11 and the lower elastic body layer 12 other than rubber. A plurality of concave portions for the solution in which each of them can swell by denting in the upper surface side are formed on the lower surface of the upper elastic body layer 11, which is the surface of the upper elastic body layer 11 contacting with the lower elastic body layer 12. The plurality of concave portions become injection chambers 21 and 22 in which the solutions are injected, a reaction chamber 23 in which the solutions in the injection chambers 21 and 22 react with one another and dispensing chambers 24 and 25 in which the solution reacted in the reaction chamber 23 are dispensed. Further, the flow path 26 connecting the injection chamber 21 and the reaction chamber 23, the flow path 27 connecting the injection chamber 22 and the reaction chamber 23, the flow path 28 connecting the reaction chamber 23 and the dispensing chamber 24 and the flow path 29 connecting the reaction chamber 23 and the dispensing chamber 25 are formed on the lower surface of the upper elastic body layer 11. The injection chambers 21 and 22 and the dispensing chambers 24 and 25 are formed in a circular shape in a plan view, and the reaction chamber 23 is formed in an oval shape in a plan view. The attachment area which is the lower surface of the upper elastic body layer 11 excluding the injection chambers 21 and 22, the reaction chamber 23, the dispensing chambers 24 and 25 and the flow path 26 to 29 is attached to the uppers surface of the lower elastic body layer 12. In such way, the injection chambers 21 and 22, the reaction chamber 23, the dispensing chambers 24 and 25 and the flow path 26 to 29 are hermetically sealed by the upper elastic body layer 11 and the lower elastic body layer 12, and the outside leakage of the after mentioned solutions X, Y and Z is prevented.

As shown in FIGS. 2A to 3B, two convex portions 121 and 122 which protrude downward and which engage with the substrate 13 are formed on the lower surface of the lower elastic body layer 12. The convex portions 121 and 122 are formed at the center position in the width direction at the both end portions of the lower elastic body layer 12 in the longitudinal direction, respectively. Each convex portion 121 and 122 is formed in a cylindrical shape, and engages with the concave portions 131 and 132 having the same shape as the convex portions 121 and 122 which are formed at the positions corresponding to the two convex portions 121 and 122 on the upper surface of the substrate 13, respectively. When the substrate 13 and the cartridge 1 are fixed at only one position, the cartridge 1 rotates with respect to the substrate 13. However, by fixing the substrate 13 and the cartridge 1 at two points as described above, R and θ are determined and the cartridge 1 cannot move in the two dimensional direction. As a result, the positioning of the lower elastic body layer 12 and the substrate 13 and the fixing of the lower elastic body layer 12 and the substrate 13 can be carried out at the same time.

The substrate 13 is made of hard material such as metal, resin or the like so that the substrate 13 have a resistance to the external force from the upper elastic body layer 11 and the lower elastic body layer 12, and is formed in an elongated planar shape to determine the position and to maintain the shape. At the both end portions on the upper surface of the substrate 13 in the longitudinal direction, the concave portions 131 and 132 are formed at the positions corresponding to the convex portions 121 and 122, respectively. The concave portions 131 and 132 penetrate the upper surface and the lower surface of the substrate 13, and the diameter $d_2$ of the concave portions 131 and 132 are formed smaller than the diameter $d_1$ of the convex portions 121 and 122. Because the convex portions 121 and 122 are made of elastic material, the substrate 13 and the lower elastic body layer 12 are fixed by the convex portions 121 and 122 appressed to the concave portions 131 and 132 when the convex portions 121 and 122 are fitted inside the concave portions 131 and 132. Further, because the convex portions 121 and 122 and the convex portions 131 and 132 are fitted by the elasticity of the convex portions 121 and 122 as described above, they are unseparable from one another.

As shown in FIGS. 4A to 4D, the roller 14 partially seals the flow path 26 to 29, the chambers 21 to 25 or both the flow path 26 to 29 and the chambers 21 to 25 by applying external force to the upper elastic body layer 11 by moving on the upper elastic body layer 11 while contacting with the upper surface of the upper elastic body layer 11 to move the solutions X and Y which are in the sealed flow path 26 to 29 or in the sealed chambers 21 to 25. Further, although it is not shown in the drawings, the actuator such as a guide rail and a slider or the like which moves the roller 14 along the longitudinal direction of the cartridge 1 and a driving source or the like to drive the actuator are provided.

For example, the roller 14 is formed in an elongated cylindrical shape and extends along the width direction of the cartridge 1, and the roller 14 moves on the upper elastic body layer 11 while contacting with the upper surface of the upper elastic body layer 11. The guide rail extends along the longitudinal direction of the cartridge 1. The slider is provided along the guide rail so as to move freely, and the roller 14 is fixed to the slider. The roller 14 also moves along the guide rail by the slider moving along the guide rail, and the solution sending is carried out because the upper surface of the cartridge 1 is pressured by the roller 14 moving along the guide rail. For example, electricity, a mechanical force, an air pressure, and an oil pressure or the like are suggested as the driving source of the actuator.

Next, the solution sending operation in the chemical reaction apparatus 100 will be described.

First, the solutions X and Y are injected in the injection chambers 21 and 22 which are formed in the cartridge 1, respectively, in advance. For example, the solutions are injected in the injection chambers 21 and 22 by directly inserting the needle 20 in the upper elastic body layer 11 as shown in FIG. 1C.

FIG. 4A shows a state after the solutions X and Y are injected and before the solution sending, wherein the roller 14 is positioning at the left end portion on the upper surface of the upper elastic body layer 11 and the lower surface of the roller 14 is pressing the upper elastic body layer 11 by contacting with the upper surface of the upper elastic body layer 11. From the state, the roller 14 moves from the left side to the right side along the upper surface of the upper elastic body layer 11. Here, the solutions X and Y which are contained in the injection chambers 21 and 22 are pushed out in the right direction while the upper surface of the upper elastic body layer 11 being pressed by the lower surface of the roller 14, and the solutions X and Y move to the reaction chamber 23 through the flow path 26 and 27.

As shown in FIG. 4B, the roller 14 moves further to the right side along the upper surface of the upper elastic body layer 11. In such case, the solutions which are in the flow path 26 and 27 and in the reaction chamber 23 are also pushed out in the right direction while the upper surface of the upper elastic body layer 11 being pressed by the lower surface of the roller 14. The solutions X and Y which are sent into the reaction chamber 23 are mixed and react with one another when the roller 14 moves along the area of the reaction chamber 23 on the upper elastic body layer 11. Here, the reaction means mixing, synthesis, dissolution, separation or the like. For example, by using the cartridge 1 in such way, the dioxine, the DNA or the like can be detected. Here, the roller 14 is pressurizing the upper surface of the upper elastic body layer 11 and the back flow of the solutions which are sent is prevented.

Subsequently, the reacted solution Z which reacted in the reaction chamber 23 moves to the dispensing chambers 24 and 25 from the flow path 28 and 29 by the roller 14 moving as shown in FIGS. 4C and 4D.

According to the first embodiment, the chemical reaction cartridge is formed in a two layer structure comprising the upper elastic body layer 11 and the lower elastic body layer 12, and a plurality of chambers 21 to 25, the flow path 26 and 29 which connect the plurality of chambers 21 to 25 are provided between the upper elastic body layer 11 and the lower elastic body layer 12. Therefore, the adherability and the permeability of the solutions to the upper elastic body layer 11 and the lower elastic body layer 12 are equal, and a fine solution sending is carried out.

Moreover, the hard substrate 13 is attached to the lower surface of the lower elastic body layer 12 by the convex portions 121 and 122 engaging with the concave portions 131 and 132. Therefore, the positioning and the fixing is easy when the lower elastic body layer 12 and the substrate 13 are attached, and the lower elastic body layer 12 and the substrate 13 can be fixed surely. Further, the solution can be moved surely and easily without an occurrence of a solution pool even when the solutions in the chambers 21 to 25 and in the flow path 26 to 29 are moved by applying external force to the upper surface of the upper elastic body layer 11. Fixing of the position is very important in order to decide the relative position of the cartridge 1 and the roller 14 because the cartridge 1 is easy to deform by the upper elastic body layer 11 and the lower elastic body layer 12.

The diameter $d_1$ of the convex portions 121 and 122 are larger than the diameter $d_2$ of the concave portions 131 and 132, and the convex portions 121 and 122 and the concave portions 131 and 132 are fixed by the elastic deformation force. Therefore, the adhesiveness of the convex portions 121 and 122 and the concave portions 131 and 132 are high, and the engagement of the convex portions 121 and 122 and the concave portions 131 and 132 become stronger. Because the lower elastic body layer 12 and the substrate 13 are separable from one another, they can be recycled, and the substrate 13 can be separated for disposing. Thus, it is greatly preferable for environment.

Second Embodiment

Figure 5A:
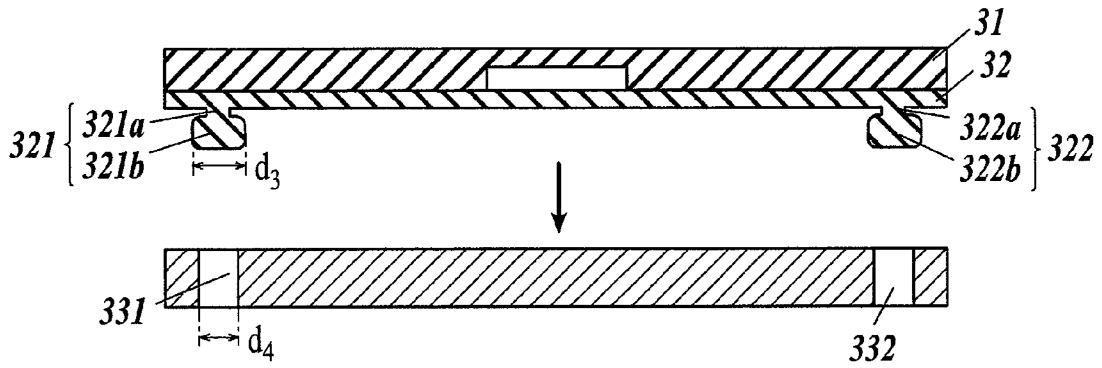
Figure 5B:
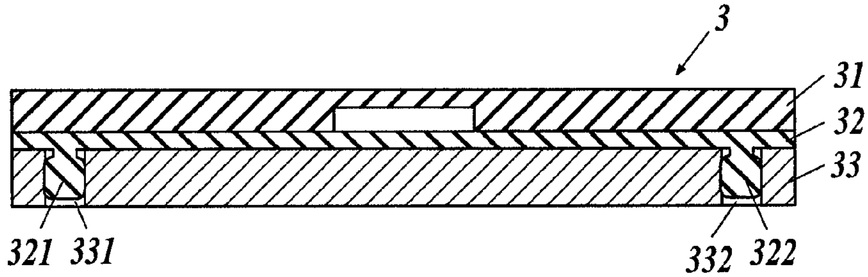

FIGS. 5A and 5B are cross-sectional views of a chemical reaction cartridge 3 cut along the line II-II of FIG. 1B, wherein FIG. 5A shows a state before a two layered elastic member 31, 32 and a substrate 33 are attached and FIG. 5B shows a state after the two layered elastic body 31, 32 and the substrate 33 are attached.

In the second embodiment, the shapes of the convex portions 321 and 322 of the lower elastic body layer 32 and the concave portions 331 and 332 of the substrate 33 are different from the first embodiment, and the other structures are same as the first embodiment. Therefore, descriptions will be given only for the different parts.

As shown in FIGS. 5A and 5B, the convex portions 321 and 322 of the lower elastic body layer 32 comprise rod shaped parts 321*a* and 322*a* protruded downward and oval parts 321*b* and 322*b* formed in an oval shape which is horizontally long when seen from the side which are formed at the tips of the rod shaped parts 321*a* and 322*a*. The oval parts 321*b* and 322*b* can contract in horizontal direction because they are made of elastic material.

The concave portions 331 and 332 of the substrate 33 are formed in a cylindrical shape and they penetrate the upper surface and the lower surface of the substrate 33. The horizontal width $d_4$ of the concave portions 331 and 332 are formed smaller than the horizontal width $d_3$ of the oval parts 321*b* and 322*b* and larger than the horizontal width of the rod shaped parts 321*a* and 322*a*. By forming the horizontal width $d_3$ of the oval parts 321*b* and 322*b* larger than the horizontal width $d_4$ of the concave portions 331 and 332, the oval parts 321*b* and 322*b* can be adhesive and can be tightly fixed in the concave portions 331 and 332 by using the elastic force of the oval parts 321*b* and 322*b*.

According to the second embodiment, the same effects as the first embodiment can be obtained. Further, the convex portions 321 and 322 are formed at the center positions in the width direction at the both end portions of the lower elastic body layer 32 in the longitudinal direction, the concave portions 331 and 332 are formed at the position corresponding to the convex portions 321 and 322 at the both end portions of the substrate 33 in the longitudinal direction, respectively, and the convex portions 321 and 322 and the concave portions 331 and 332 are respectively engaged to each other.

Third Embodiment

Figure 6A:
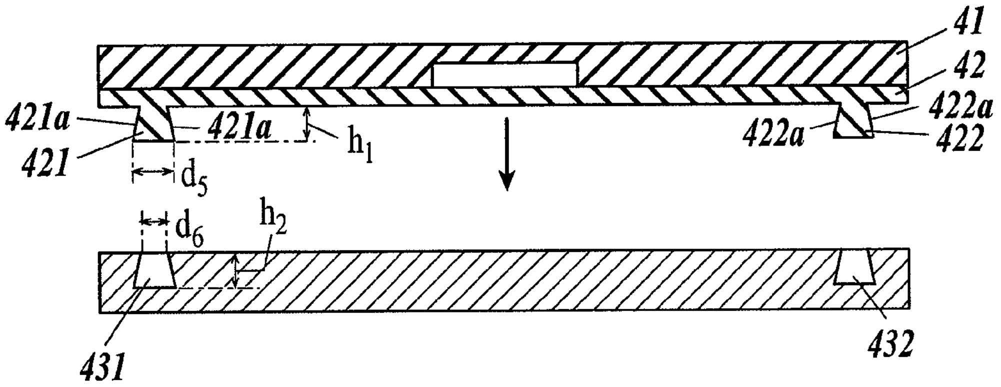
Figure 6B:
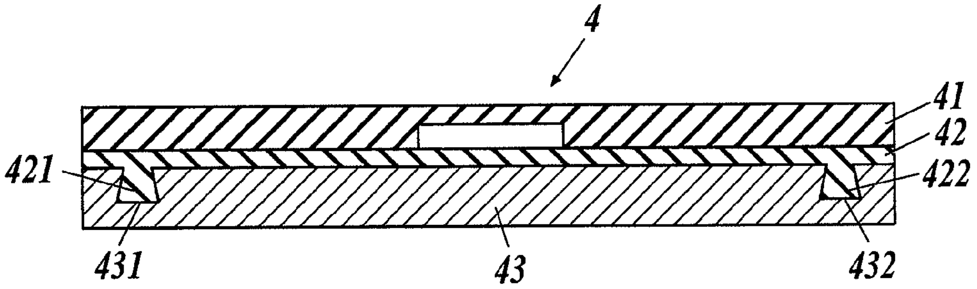

FIGS. 6A and 6B are cross-sectional views of a chemical reaction cartridge 4 cut along the line II-II of FIG. 1B, wherein FIG. 6A shows a state before a two layered elastic body 41, 42 and a substrate 43 are attached and FIG. 6B shows a state after the two layered elastic body 41, 42 and the substrate 43 are attached.

In the third embodiment, the shapes of the convex portions 421 and 422 of the lower elastic body layer 42 and the concave portions 431 and 432 of the substrate 43 are different from the first embodiment, and the other structures are same as the first embodiment. Therefore, descriptions will be given only for the different parts.

As shown in FIGS. 6A and 6B, the convex portions 421 and 422 of the lower elastic body layer 42 are formed in a hook shape having an undercut shape and are protruding downward. Particularly, the convex portions 421 and 422 of the lower elastic body layer 42 are formed in a trapezoidal shape when seen from a side having tapered surfaces 421*a* and 422*a* which are spread downwardly. The convex portions 421 and 422 contract in horizontal direction and in vertical direction because they are made of elastic material.

The concave portions 431 and 432 of the substrate 43 are formed at the positions corresponding to the convex portions 421 and 422 on the upper surface of the substrate 43 by denting downward, and the concave portions 431 and 432 do not penetrate the lower surface of the substrate 43. The concave portions 431 and 432 are formed in an undercut shape as same as the convex portions 421 and 422, and the horizontal width $d_6$ of the concave portions 431 and 432 in the opening side are formed smaller than the horizontal width $d_5$ of the convex portions 421 and 422 in the bottom side. By forming the horizontal width $d_5$ of the convex portions 421 and 422 larger than the horizontal width $d_6$ of the concave portions 431 and 432, the convex portions 421 and 422 can be adhesive and tightly fixed in the concave portions 431 and 432 by using the elastic force of the convex portions 421 and 422. Further, the elastic force can be also used in the thickness direction (vertical direction) when the height $h_1$ of the convex portions 421 and 422 are formed shorter than the depth $h_2$ of the concave portions 431 and 432.

According to the third embodiment, the same effects as the first embodiment can be obtained. Further, the engagement of the convex portions 421 and 422 and the concave portions 431 and 432 are tight and are hard to be dislocated from one another by forming the convex portions 421 and 422 and the concave portions 431 and 432 in the undercut shape. Moreover, the convex portions 421 and 422 are formed in a hook shape at the center position in the width direction at the both end portions of the lower elastic body layer 42 in the longitudinal direction, the concave portions 431 and 432 are respectively formed in a hook shape at the position facing the convex portions 421 and 422 at both end portion of the substrate 43 in the longitudinal direction, and the convex portions 421 and 422 and the concave portions 431 and 432 are engaged with one another. Therefore, R and θ of the lower elastic body layer 42 and the substrate 43 are fixed, and the positioning and the fixing of the lower elastic body layer 42 and the substrate 43 can be carried out at the same time.

Fourth Embodiment

Figure 7A:
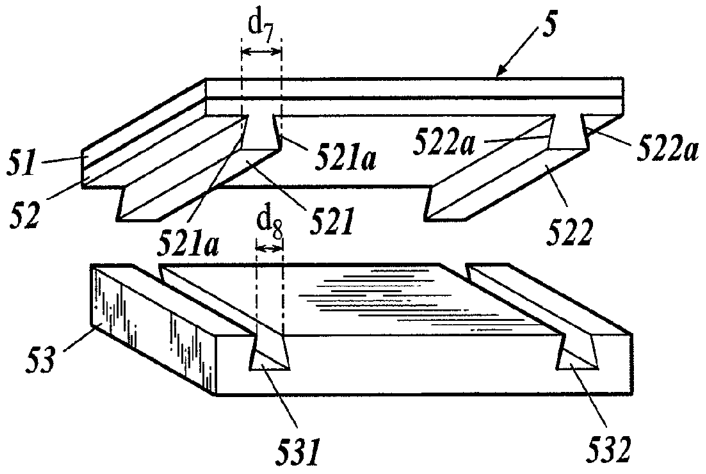
FIG. 7A is a perspective view showing a state before a two layered elastic body 51, 52 and a substrate 53 are attached in a chemical reaction cartridge 5.
Figure 7B:
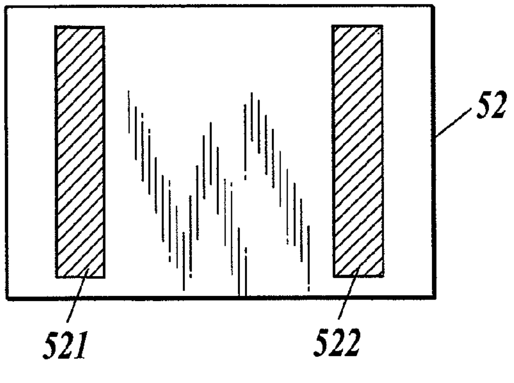
FIG. 7B is a bottom view of the lower elastic body layer 52 in FIG. 7A.

FIG. 7A is a perspective view showing a state before a two layered elastic body 51, 52 and a substrate 53 are attached in a chemical reaction cartridge 5, and FIG. 7B is a bottom vie of the lower elastic body layer 52 in FIG. 7A.

In the fourth embodiment, the convex portions 521 and 522 of the lower elastic body layer 52 and the concave portions 531 and 532 of the substrate 53 are different from the first embodiment, and the other structures are same as the first embodiment. Therefore, descriptions will be given only for the different parts.

As shown in FIGS. 7A and 7B, the convex portions 521 and 522 of the lower elastic body layer 52 are in a strip form having an undercut shape and are protruding downwardly. Particularly, the convex portions 521 and 522 of the lower elastic body layer 52 are formed in a trapezoidal shape when seen from a side having tapered surfaces 521*a* and 522*a* which are spread downwardly. The convex portions 521 and 522 are formed by extending in the width direction at both end portions of the lower elastic body layer 52 in the longitudinal direction. The convex portions 521 and 522 contract in horizontal direction because they are made of elastic material.

The concave portions 531 and 532 of the substrate 53 are formed by denting downward and by extending in the width direction of the substrate at the positions corresponding to the convex portions 521 and 522 on the upper surface of the substrate 53, and the concave portions 531 and 532 do not penetrate the lower surface of the substrate 53. The concave portions 531 and 532 are formed in an undercut shape which is the same shape as the convex portions 521 and 522, and the horizontal width $d_8$ of the concave portions 531 and 532 in the opening side is formed smaller than the horizontal width $d_7$ of the convex portions 521 and 522 in the bottom side. By forming the horizontal width $d_7$ of the convex portions 521 and 522 larger than the horizontal width $d_8$ of the concave portions 531 and 532, the convex portions 521 and 522 can be adhesive and tightly fixed in the concave portions 531 and 532 by using the elastic force of the convex portions 521 and 522.

According to the fourth embodiment, the same effects as the first embodiment can be obtained. Further, the engagement of the convex portions 521 and 522 and the concave portions 531 and 532 are tight and they are hard to be dislocated from one another by forming the convex portions 521 and 522 and the concave portions 531 and 532 in an undercut shape. Further, the convex portions 521 and 522 are in a strip form extending in the width direction at both end portions of the lower elastic body layer 52 in the longitudinal direction, and the concave portions 531 and 532 are in a strip form extending in the width direction facing the convex portions 521 and 522 at both end portions of the substrate 53 in the longitudinal direction. Therefore, the contacting area of the convex portions 521 and 522 and the concave portions 531 and 532 is large and the fixing force increases when the convex portions 521 and 522 and the concave portions 531 and 532 are engaged with one another. Thus, the two layered elastic body 51, 52 can be positioned without drifting from the substrate 53 even when the solutions in the chambers and the flow path are moved by applying external force to the upper elastic body layer 51 from outside, and the solution sending is carried out smoothly.

The present invention is not limited to the above described embodiments, and can be arbitrarily modified within the scope of the invention.

For example, in the above described third and fourth embodiments, the lower elastic body layer 42, 52 and the substrate 43, 53 may be attached by the two-color molding method. By using the two-color molding, the lower elastic body layer 42, 52 and the substrate 43, 53 can be molded and can be attached at once, and the labor of construction can be eliminated.

Figure 7C:
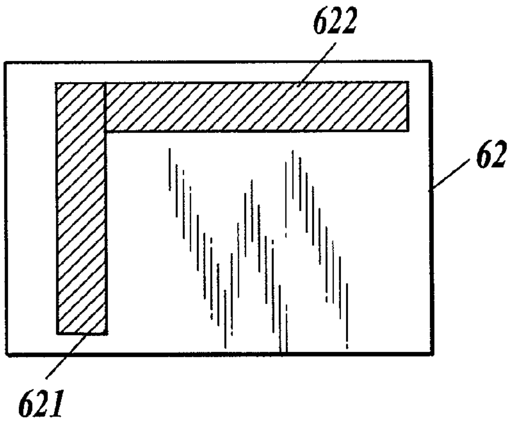
FIG. 7C is a bottom view showing a modification of a lower elastic body layer 62.

Moreover, in the above described fourth embodiment, the two convex portions 521 and 522 are formed by extending in the width direction at the both end portions of the lower elastic body layer 52 in the longitudinal direction, and the two concave portions 531 and 532 are formed by extending in the width direction at the both end portions of the substrate 53 in the longitudinal direction so as to correspond to the convex portions 521 and 522. However, as shown in FIG. 7C, the convex portion 621 may be formed by extending in the width direction at an end portion of the lower elastic body layer 62 in the longitudinal direction, and the convex portion 622 may be formed by extending in the longitudinal direction. Although it is not shown in the drawing, the concave portions may be respectively formed on the upper surface of the substrate at the positions which correspond to the convex portions 621 and 622 in the similar manner. Further, although it is not shown in the drawing, more than two convex portions and the concave portions may be formed. By forming the convex portions 521 and 522 and the concave portions 531 and 532 in a strip form, the cartridge 5 can be fixed in the longitudinal direction and in the width direction and the flicking of the substrate 53 from the lower elastic body layer 52 can be prevented at the same time.

Moreover, in the first to the third embodiments, the number and the position of the convex portions 121 and 122, 321 and 322, 421 and 422 and 521 and 522 and the concave portions 131 and 132, 331 and 332, 431 and 432 and 531 and 532 may be arbitrarily changed. Further, the shapes of the convex portions 121 and 122, 321 and 322, 421 and 422 and 521 and 522 and the concave portions 131 and 132, 331 and 332, 431 and 432 and 531 and 532 are not limited to the shapes described above, and they can be arbitrarily changed as long as they are in the shape which are engageable to one another and separable from one another.

Furthermore, the convex portions 121 and 122, 321 and 322, 421 and 422 and 521 and 522 are formed on the lower elastic body layer 12, 32, 42, and 52, and the concave portions 131 and 132, 331 and 332, 431 and 432 and 531 and 532 are formed on the substrate 13, 33, 43 and 53. However, contrarily, the concave portions may be formed on the lower elastic body layer and the convex portions may be formed on the substrate.

Moreover, in the first to the fourth embodiments, the elastic body is in the two layered structure comprising the upper elastic body layer 11, 31, 41 and 51 and the lower elastic body layer 12, 32, 42 and 52. However, the elastic body may be structured in three layers or more.

Furthermore, the elastic bodies 11 and 12 and the substrate 13 may be fixed by adhesion. In such case, the elastic bodies 11 and 12 and the substrate 13 are hard to be separated. However, the problem of the adherability and the permeability of the solution can be improved because the flow path can be formed by using the same material for the inside solution.

According to a first aspect of the preferred embodiments of the present invention, there is provided a chemical reaction cartridge comprising an elastic body with which at least a portion of the chemical reaction cartridge is formed and a plurality of chambers and a flow path to connect the plurality of chambers, which contain solution inside, and the solution is moved or blocked in the chambers and the flow path by applying external force to the elastic body from outside, the elastic body is structured in at least two elastic body layers which are layered vertically and the plurality of chambers and the flow path are provided between an upper elastic body layer and a lower elastic body layer, and the elastic body is attached to a surface of a substrate made of hard material.

According to a second aspect of the preferred embodiments of the present invention, there is provided a chemical reaction cartridge comprising an elastic body with which at least a portion of the chemical reaction cartridge is formed and a plurality of chambers and a flow path to connect the plurality of chambers, which contain solution inside, and the solution is moved or blocked in the chambers and the flow path by applying external force to the elastic body from outside, the elastic body is structured in at least two elastic body layers which are layered vertically and the plurality of chambers and the flow path are provided between an upper elastic body layer and a lower elastic body layer, and a substrate which is harder than the elastic body is attached to a lower surface of the lower elastic body layer by a concave portion formed on one of the lower surface of the lower elastic body layer and an upper surface of the substrate engaging with a convex portion formed on other of the lower surface of the lower elastic body layer and the upper surface of the substrate.

Preferably, a diameter of the convex portion is larger than a diameter of the concave portion, and the convex portion and the concave portions are fixed by an elastic deformation force of the elastic body when the convex portion engages with the concave portion.

Preferably, the convex portion and the concave portion have an undercut shape.

Preferably, the convex portion and the concave portion have a hook shape.

Preferably, the convex portion and the concave portion are in a strip form.

Preferably, the lower elastic body layer and the substrate are separable from one another.

Preferably, the lower elastic body layer and the substrate are attached by a two-color molding method.

According to a third aspect of the preferred embodiments of the present invention, there is provided a method for using a chemical reaction cartridge comprising an elastic body with which at least a portion of the chemical reaction cartridge is formed and a plurality of chambers and a flow path to connect the plurality of chambers, which contain solution inside, the method comprising moving or blocking the solution in the chambers and the flow path by applying external force to the elastic body from outside, providing the plurality of chambers and the flow path between an upper elastic body layer and a lower elastic body layer, the elastic body being structured in at least two layers in which the upper elastic body layer and the lower elastic body layer are layered vertically attaching the elastic body to a hard substrate, and disposing the elastic body and recycling the substrate after a chemical reaction of the solution is carried out.

According to the present invention, the adherability and the permeability of the solution to the upper elastic body layer and the lower elastic body layer are equal because a plurality of chambers and the flow path are provided between the upper elastic body layer and the lower elastic body layer. Therefore, a fine solution sending can be carried out.

Further, the positioning and the fixing of the lower elastic body layer and the hard substrate are carried out easily and also they can be fixed surely when the lower elastic body layer and the hard substrate are attached. The solution sending can be carried out smoothly without the occurrence of the solution pool even when the solutions in the chambers or in the flow path are moved by applying external force on the upper surface of the elastic body.

The entire disclosure of Japanese Patent Application No. 2007-007281 filed on Jan. 16, 2007 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A chemical reaction cartridge, comprising:

an elastic body with which at least a portion of the chemical reaction cartridge is formed; and a plurality of chambers and a flow path to connect the plurality of chambers, which contain solution inside, wherein the solution is moved or blocked in the chambers and the flow path by applying external force to the elastic body from outside, the elastic body is structured in at least two elastic body layers which are layered vertically and the plurality of chambers and the flow path are provided between an upper elastic body layer and a lower elastic body layer, a substrate which is harder than the elastic body is attached to a lower surface of the lower elastic body layer by a concave portion formed on one of the lower surface of the lower elastic body layer and an upper surface of the substrate engaging with a convex portion formed on other of the lower surface of the lower elastic body layer and the upper surface of the substrate, and a diameter of the convex portion is larger than a diameter of the concave portion, and the convex portion and the concave portion are fixed by an elastic deformation force of the elastic body when the convex portion engages with the concave portion.

2. The chemical reaction cartridge as claimed in claim 1, wherein the convex portion and the concave portion have an undercut shape.

3. The chemical reaction cartridge as claimed in claim 2, wherein the convex portion and the concave portion are in a strip form.

4. The chemical reaction cartridge as claimed in claim 2, wherein the substrate is attached to the lower elastic body layer by pressing the convex portion into the concave portion so that the undercut shape of the convex portion locks into the concave portion.

5. The chemical reaction cartridge as claimed in claim 1, wherein the convex portion and the concave portion have a hook shape.

6. The chemical reaction cartridge as claimed in claim 1, wherein the convex portion and the concave portion are in a strip form.

7. The chemical reaction cartridge as claimed in claim 6, wherein a diameter of the convex portion at a distal end thereof is larger than a diameter of the convex portion at a proximal end thereof, and a diameter of an opening end of the concave portion is smaller than a diameter of an interior end of the concave portion.

8. The chemical reaction cartridge as claimed in claim 1, wherein the lower elastic body layer and the substrate are separable from one another.

9. The chemical reaction cartridge as claimed in claim 1, wherein the lower elastic body layer and the substrate are attached by a two-color molding method.

10. The chemical reaction cartridge as claimed in claim 1, wherein the substrate is attached to the lower elastic body layer by pressing the convex portion into the concave portion in order to create a press fit due to the elasticity of the lower elastic body layer.

11. The chemical reaction cartridge as claimed in claim 1, further comprising means for attaching the substrate to the lower surface of the lower elastic body layer using an elastic deformation force.

12. The chemical reaction cartridge as claimed in claim 1, wherein the concave portion comprises two concave portions, and the convex portion comprises two convex portions, and wherein the convex portions are formed respectively at a center position in a width direction at end portions of the one of the lower surface of the lower elastic body layer and the upper surface of the substrate in the longitudinal direction, and the concave portions are formed in the other of the one of the lower surface of the lower elastic body layer and the upper surface of the substrate to correspond respectively to the convex portions.

13. The chemical reaction cartridge as claimed in claim 1, wherein a diameter of the convex portion at a distal end thereof is larger than a diameter of the convex portion at a proximal end thereof, and a diameter of an opening end of the concave portion is smaller than a diameter of an interior end of the concave portion.

14. The chemical reaction cartridge as claimed in claim 1, wherein the substrate is attached to the lower surface of the lower elastic body layer by the concave portion engaging with the convex portion without an adhesive.

15. A method for using a chemical reaction cartridge comprising an elastic body with which at least a portion of the chemical reaction cartridge is formed and a plurality of chambers and a flow path to connect the plurality of chambers, which contain solution inside, the method, comprising:

moving or blocking the solution in the chambers and the flow path by applying external force to the elastic body from outside, providing the plurality of chambers and the flow path between an upper elastic body layer and a lower elastic body layer, the elastic body being structured in at least two layers in which the upper elastic body layer and the lower elastic body layer are layered vertically attaching the elastic body to a hard substrate, and disposing the elastic body and recycling the substrate after a chemical reaction of the solution is carried out.

16. A chemical reaction cartridge, comprising:

an elastic body with which at least a portion of the chemical reaction cartridge is formed; and a plurality of chambers and a flow path to connect the plurality of chambers, which contain solution inside; and means for attaching the substrate to the lower surface of the lower elastic body layer, wherein the solution is moved or blocked in the chambers and the flow path by applying external force to the elastic body from outside, the elastic body is structured in at least two elastic body layers which are layered vertically and the plurality of chambers and the flow path are provided between an upper elastic body layer and a lower elastic body layer, and a substrate which is harder than the elastic body is attached to the lower surface of the lower elastic body layer by the means for attaching the substrate.

* * * * *